(No Model.)
E. T. WINKLER.
HOSE COUPLING.
No. 533,419. Patented Jan. 29, 1895.
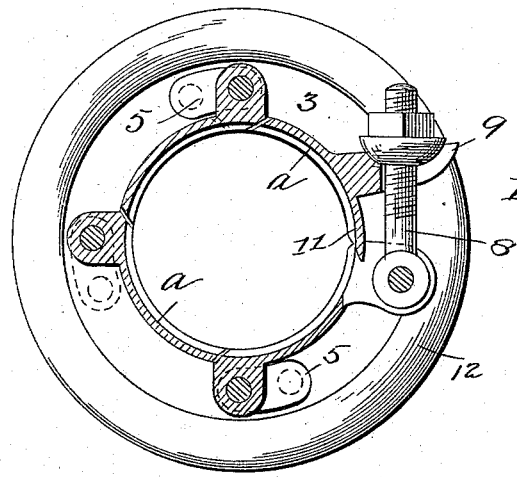
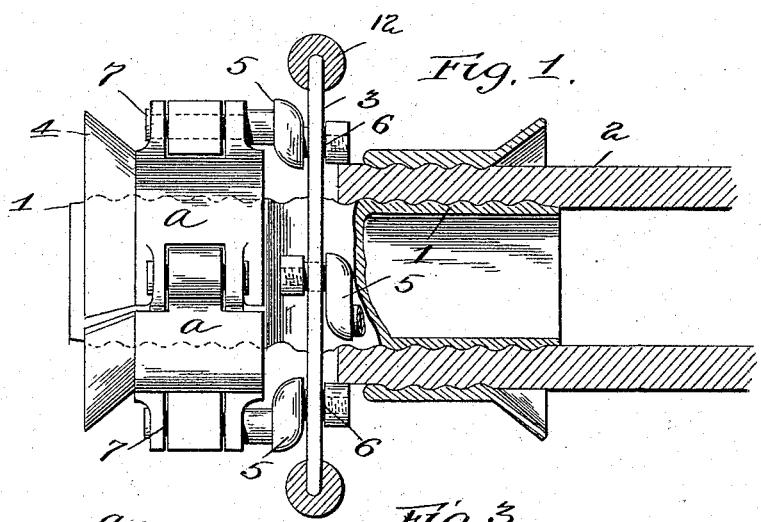
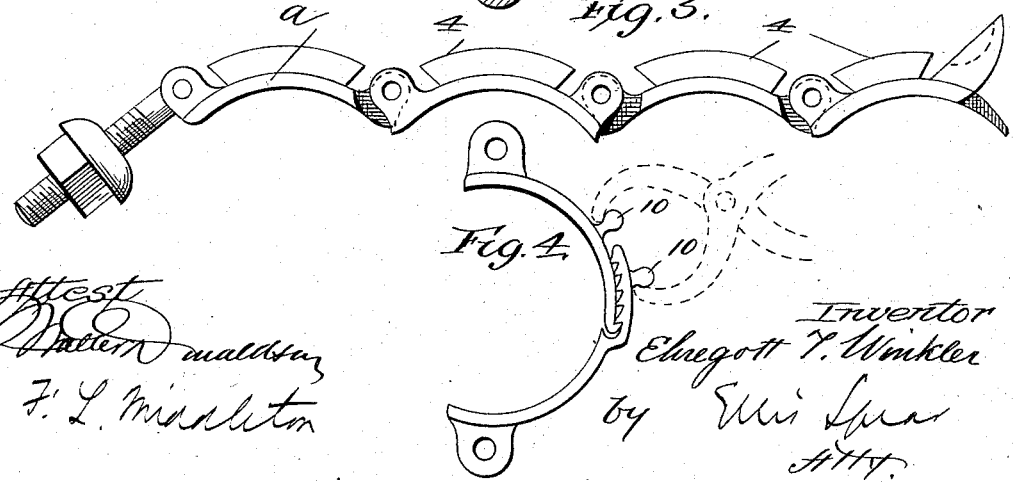
Attest:
F. L. Middleton
Inventor
Elnegott T. Winkler
by Ellis Spear
Atty.

ated in the accom-
UNITED STATES PATENT OFFICE.

EHREGOTT T. WINKLER, OF KANSAS CITY, MISSOURI, ASSIGNOR, BY DIRECT AND MESNE ASSIGNMENTS, TO THE WINKLER MACHINE MANUFACTURING COMPANY, OF SAME PLACE.

HOSE-COUPLING.

SPECIFICATION forming part of Letters Patent No. 533,419, dated January 29, 1895.

Application filed February 16, 1894. Serial No. 500,390. (No model.)

*To all whom it may concern:*

Be it known that I, EHREGOTT T. WINKLER, a citizen of the United States of America, residing at Kansas City, in the county of Jackson and State of Missouri, have invented certain new and useful Improvements in Hose-Couplings, of which the following is a specification.

My invention is an improvement in hose couplings, of that class in which a detachable clamp is arranged to encircle the end of the hose section, and to compress it upon an interior sleeve. It is illustrated in the accompanying drawings, in which—

Figure 1—represents the coupling partly in side elevation and partly in section. Fig. 2— shows a section of Fig. 1 on line $xx$. Fig. 3— is a side view of the clamp in an open position, and Fig. 4— illustrates a detail of construction.

In the drawings, the interior sleeve is represented at 1. Fig. 1 shows this on the right hand side in section in full lines, but on the left hand side it is shown in dotted lines. Over the end upon the right hand side, the figure shows the end of the hose 2 in place. The end of the sleeve 1 is corrugated circumferentially, as shown in section, and by the dotted lines on the left. Midway of the sleeve is fixed thereon a circumferential flange 3. This is preferably formed integral with the sleeve.

The clamp or clamping band is shown more clearly in Fig. 3. It is composed of links $a$, hinged together by pivotal bolts, through outwardly turned ears on the ends of the links, so that, when the clamp is closed, a smooth interior surface is presented, and the clamp forms a complete circular or tube section. The outer ends of the clamp sections are extended and outwardly flared, as shown at 4, forming, when the clamp is closed, a flaring end. This is for the purpose of facilitating the entrance of the hose. For the same purpose, the outer surface of the sleeve is beveled off at the end.

The clamp sections are held to the flange 3 by means of intermediate links 5. These links are connected to the flange by pivots 6, and the other end of the link is pivoted upon the bolt 7, which connects the ends of contiguous clamp sections. In this way the clamps are permanently connected with the sleeve, and are permitted to move outward in opening the pivoted links, acting as cranks. There may be only two of these links on each clamp, and they are arranged opposite to each other. Those of one clamp are shown in full lines in Fig. 2, and appear on the upper and lower part of Fig. 1. One of the links of the clamp on the other side of the flange 3, appears in dotted lines on the left-hand side of Fig. 2, that upon the right-hand side not being shown. The clamp shown in section Fig. 2, is drawn together by means of a bolt 8, pivoted in the ear of one end of the clamp and lodged in the slotted end of the ear 9, at the other end of the clamp, being held by a nut on the end of the pivoted bolt 8. By this construction, the clamps are not only held to the sleeve by a permanent attachment, but they are also held in the same relation to the sleeve, and this permanent relation renders effective, the interior circumferential corrugation on the sleeve, the ridges of this corrugation, being arranged opposite to the grooves of the corrugation upon the exterior surface of the sleeve. By this arrangement, the clamp is caused to press the flexible hose into the corrugations, as illustrated in Fig. 2, and thus to hold it firmly against parting under longitudinal strain.

Instead of bolt 8, which is commonly used in these clamps I have devised a simpler form of connection for the clamp ends, which is shown in Fig. 4. In this form the clamp ends are arranged to lap, the overlap having interior teeth, and the under lap corresponding exterior, both sets having inclined or hooked engaging surfaces. On the exterior of the engaging ends, are studs 10, which may be taken hold of by suitable pinchers, as illustrated in dotted lines, for the purpose of drawing the ends together, and thus putting the proper strain upon the clamp. In this form the under-lapping extension of the clamp section takes the place of the extension 11, in the other form of connection shown in Fig. 2.

For the purpose of providing a buffer on the edge of the flange 3, I provide a rubber gasket 12, which is sprung over the edge of said flange.

Having thus described my invention, what I claim is—

1. In a hose coupling a corrugated sleeve adapted to fit within the hose a central flange and a sectional clamp pivoted to the central flange by link connections, said links extending circumferentially about the clamp and said sections being movable outwardly from the periphery of the hose, substantially as described.

2. In combination with a central flange 3, a sleeve 1, extending therefrom, and a clamp formed of sections pivoted together and to said flange by interposed links, substantially as described.

3. A coupling sleeve having a circumferential flange combined with a sectional clamp and the intermediate connecting links, substantially as described.

In testimony whereof I affix my signature in presence of two witnesses.

EHREGOTT T. WINKLER.

Witnesses:
 HENRY E. COOPER,
 JAMES M. SPEAR.